United States Patent [19]

van der Lely et al.

[11] 4,085,853
[45] Apr. 25, 1978

[54] CONSTRUCTION OF BUILDINGS OR PARTS THEREOF

[76] Inventors: Cornelis van der Lely, 7, Bruschenrain, Zug; Hendricus Jacobus Cornelis Nieuwenhoven, Hirssattelweg, 6340 Baar, both of Switzerland

[21] Appl. No.: 680,383

[22] Filed: Apr. 26, 1976

Related U.S. Application Data

[63] Continuation of Ser. No. 318,244, Dec. 26, 1972, abandoned.

[30] Foreign Application Priority Data

Dec. 27, 1971 Netherlands .................. 7117854

[51] Int. Cl.² ............................................. B60P 1/48
[52] U.S. Cl. .................................. 214/77 R; 52/747; 212/145; 214/1 H; 296/24 R
[58] Field of Search ............... 214/1 H, 1 S, 1 SW, 214/44 R, 38 CA, 77 R, 78, 152; 212/8 R, 8 A, 8 B, 9, 145; 296/3, 24 R; 52/125, 747, 749

[56] References Cited

U.S. PATENT DOCUMENTS

| | | | |
|---|---|---|---|
| 2,351,856 | 6/1944 | Henderson | 52/125 X |
| 2,410,777 | 11/1946 | English et al. | 212/9 |
| 2,858,031 | 10/1958 | Garmon | 214/1 H |
| 3,157,426 | 11/1964 | Groat | 296/3 |
| 3,232,460 | 1/1966 | Rouse | 214/77 R |
| 3,253,716 | 5/1966 | Stratton | 214/77 R X |
| 3,421,791 | 1/1969 | Lindqvist | 214/77 R X |
| 3,445,014 | 5/1969 | Kullerback | 214/77 R |
| 3,650,421 | 3/1972 | Miller | 214/77 R |
| 3,720,326 | 3/1973 | Payraudeau et al. | 214/44 R X |

Primary Examiner—L. J. Paperner
Attorney, Agent, or Firm—Mason, Mason & Albright

[57] ABSTRACT

A tractor-trailer combination is used in a method of constructing a building wherein the trailer has an elongated rectangular walled space (divided longitudinally into three spaces) for hauling walls, construction materials or mold parts to the building site. In the after portion of the trailer and to the rear but near its after wheels, a discharging device is mounted on a support so as to be rotatable about a vertical axis. The discharging device, which is hydraulically controlled, has an arm with three parts, the middle part being the shortest. The outer part which has a coupling member at its end is adapted to lift the walls or mold parts from the trailer and place them at their approximate desired locations on the building site. A mobile auxiliary jack connectable to a hydraulic system of the tractor-trailer combination is used to position the walls or mold parts more accurately. A floor, previously cast, has projections for spacing the mold parts at their bottoms. Stabilizing members pivot outward from the discharging device to engage the ground and provide bracing beyond the trailer's wheels when the discharging device is in use. When not in use, the discharging device rides centrally along the longitudinal axis of the trailer with its outer end on a support, its coupling member above the cab of the tractor, and the stabilizing members are folded adjacent the support for mounting the discharging device. The discharging device has sufficient reach whereby with the rear of the trailer in a single location adjacent the building site, all the walls or mold parts can be positioned by the discharging device substantially in their predetermined locations so that they can be connected to form the building's walls or a mold for casting the walls of the building with minimal further adjustments.

24 Claims, 12 Drawing Figures

CONSTRUCTION OF BUILDINGS OR PARTS THEREOF

RELATED APPLICATIONS

This is a continuing application of application Ser. No. 318,244 filed Dec. 26, 1972, now abandoned.

SUMMARY OF THE INVENTION

This invention relates to methods of constructing buildings and parts thereof. More particularly, it relates to methods wherein walls, portions of walls or molds making of walls or wall portions, or a combination thereof are conveyed to building sites by transport means. A method in accordance with the invention is particularly, but not exclusively, suitable for the erection of parts of smaller buildings such as, for example, cellars of prefabricated bungalows.

According to one aspect of the invention, there is provided a method of construction of the kind set forth, wherein the transport means is provided with a discharging device and said walls, portions of walls and/or molds are transferred directly by the discharging device from the transport means to substantially their appointed positions in the building that is being constructed or to substantially their positions of use in forming parts of that building.

BRIEF DESCRIPTION OF THE DRAWINGS

For a better understanding of the invention, and to show how the same may be carried into effect, reference will now be made, by way of example, to the accompanying drawings, in which.

DESCRIPTION OF THE PREFERRED EMBODIMENTS

Figure 1:
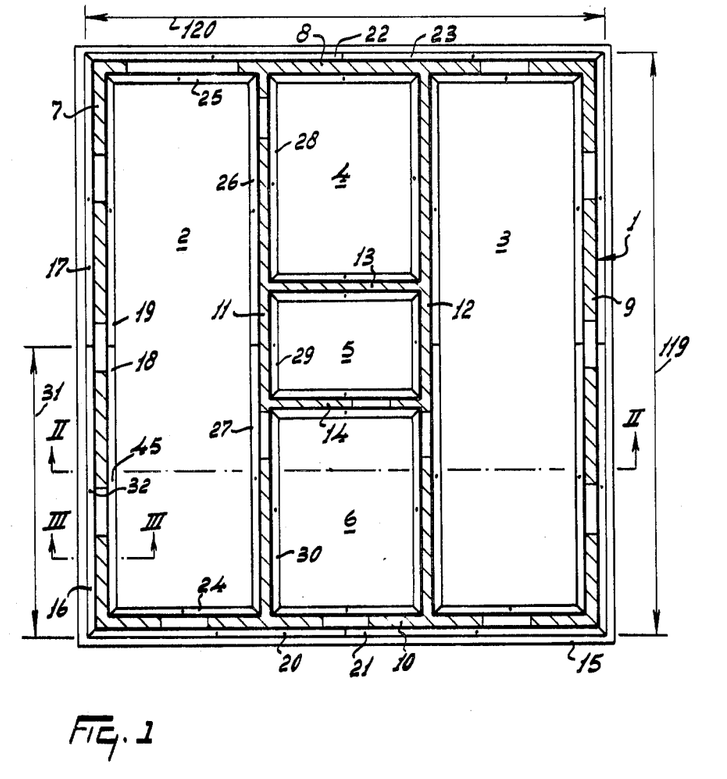
FIG. 1 is a horizontal sectional view of part of a prefabricated building showing the mold parts or jigs in which said part is formed in plan view.
Figure 2:
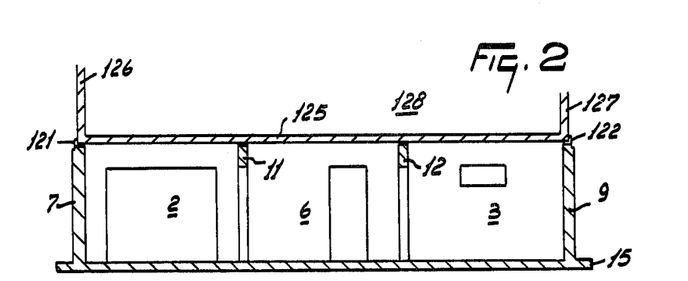
FIG. 2 is a section taken on the line II—II of FIG. 1 but with the omission of the jigs.
Figure 3:
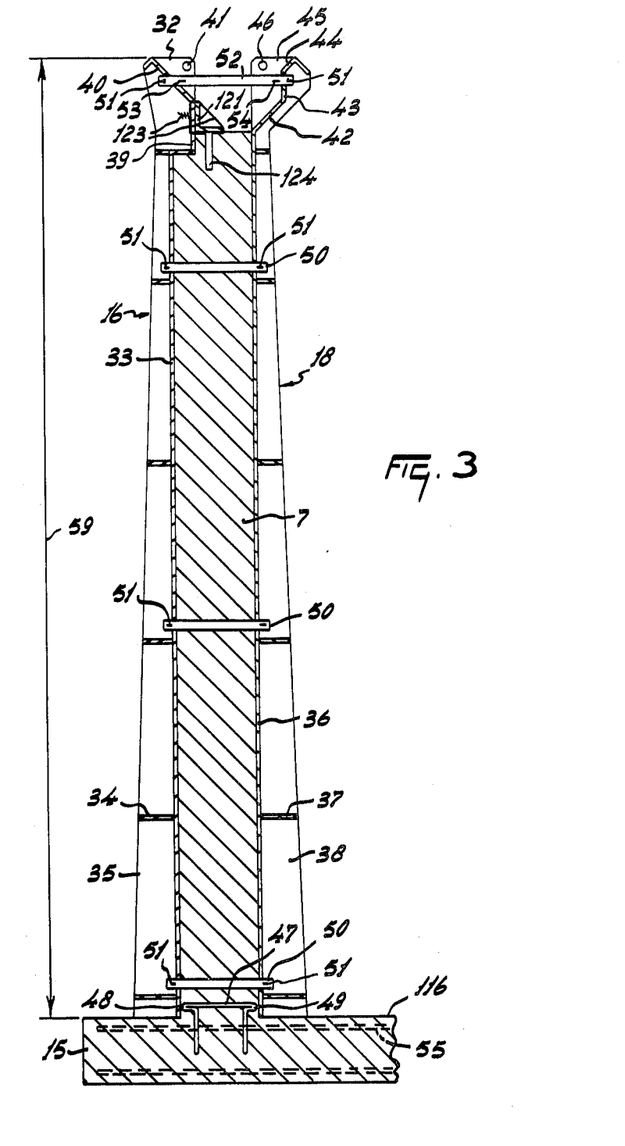
FIG. 3 is a section, to an enlarged scale, taken on the line III—III of FIG. 1 and shows two jigs with a wall formed between them.

Referring to FIGS. 1 to 3 of the drawings, the part of a building 1 which is shown in those figures is a cellar of rectangular configuration when seen in plan having formed from concrete by initially pouring the latter within space-enclosing mold parts or jigs. The cellar comprises two large rectangular spaces or rooms 2 and 3 between which three smaller rectangular rooms or spaces 4, 5 and 6 are provided. The cellar has outer walls 7, 8, 9 and 10 which together define the rectangular configuration of the cellar, the parallel opposite walls 7 and 9 being of a somewhat greater horizontal length 119 than the length 120 of the opposite parallel walls 8 and 10. Two inner walls 11 and 12 extend parallel to the walls 7 and 9 and two smaller inner walls 13 and 14 extend parallel to the walls 8 and 10 between the inner walls 11 and 12. All of the walls 7 to 14 inclusive are built on a floor 15 and all of them are preferably formed from hard concrete although it is possible to use alternative castable materials. The walls are cast inside jigs that are arranged on the floor 15, said jigs being shown in plan in FIG. 1.

The wall 7 is formed between substantially co-planar jigs 16 and 17 at one side of the wall and parallel and substantially coplanar jigs 18 and 19 at the opposite side of that wall. Substantially coplanar jigs 20 and 21 define the outer surface of the wall 10 and similar substantially coplanar jigs 22 and 23 define the outer surface of the wall 8. The inner surfaces of the portions of the walls 8 and 10 that bound the large room or space 2 are defined by inner jigs 25 and 24 respectively and the surface of the inner wall 11 that faces the wall 7 is defined by a pair of coplanar inner jigs 26 and 27. Smaller inner jigs 28, 29 and 30 define the surfaces of the inner wall 11 that correspond to the small spaces or rooms 4, 5 and 6 respectively. The further jigs that are required for the formation of the walls 8, 9, 10, 11, 12, 13 and 14 are illustrated in FIG. 1 of the drawings but have not been assigned individual reference numbers since it will be evident that they are generally similar in arrangement to other jigs that have already been mentioned. In this embodiment, each of the jigs 16, 17, 18 and 19 has a maximum length 31 of substantially 6 meters and a height 59 (FIG. 3) of substantially 2.5 meters. Each jig is provided at the center of its horizontal length with a corresponding coupling member 32 which is indicated in FIG. 1 only in respect of the jig 16.

Each of the jigs 16 to 30 inclusive comprises a metal jig plate 33 or 36 and FIG. 3 of the drawings shows the jig 16 provided with one of said plates 33 and the jig 18 provided with one of said plates 36. The plates 33 are strengthened by stiffening ribs 34 and 35 and the plates 36 are similarly strengthened by stiffening ribs 37 and 38. The uppermost edge of the plate 33 of the jig 16 carries an angular portion 39 of substantially L-shaped cross-section to the uppermost free edge of the substantially vertical limb of which an inclined portion 40 is connected. Both the angular portion 39 and the inclined portion 40 extend throughout the horizontal length 31 of the jig 16 and the inclined portion 40 is provided substantially centrally of that length with a plate having a hole 41, said apertured plate affording the corresponding coupling member 32. The upper edge of the plate 36 of the jig 18 carries an inclined portion 42 at the upper edge of which there is a vertical portion 43 whose upper edge, in turn, carries a further inclined portion 44. A plate 45 formed with a hole 46 is secured to the portions 42, 43 and 44 approximately centrally of the horizontal length of the jig 18 and opposite the plate having the hole 41, said apertured plate 45 constituting the coupling member 32 of the jig 18.

The floor 15 is provided with a plurality of guide members 4 with outward projections 48 and 49 of which afford guides for positioning the bottoms of the jigs, such as the jigs 16 and 18 (see FIG. 3). Each guide member 47 is afforded by a corresponding bent bar or rod that may be connected to reinforcement rods 55 in the floor 15. The guide members 47 may conveniently be spaced apart from one another by distances of substantially 50 centimeters so that they are sufficient in number to receive and position the jigs 16 and 18. The jigs 16 and 18 are connected to one another at different horizontal levels by bars 50 provided with "knock-out" retaining wedges 51. When in their operative positions, the wedges 51 contact the outer surfaces of the plates 33 and 36 and urge those plates inwardly against the guide projections 48 and 49. The tops of the jigs are provided with at least one spacing pin 52 which is entered through aligned holes in the inclined portion 40 and the vertical portion 43 respectively, the pin being provided with detachable stops 53 and 54 that are normally located alongside the relatively facing inner surfaces of the portions 40 and 43 and with two of the "knock-out" wedges 51 that can be engaged with the ends of the pin 52 that are beyond the relatively remote surfaces of the portions 40 and 43.

Figure 4:
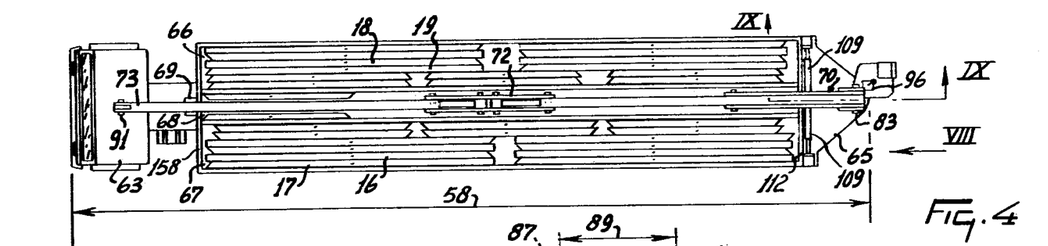
FIG. 4 is a plan view showing transport means in accordance with one feature of the invention.

The jigs that are used for making the cellar that has been described with reference to FIGS. 1 to 3 of the drawings are intended to be conveyed to the building site by transport means 61 in the form of a long trailer 62 drawn by a road tractor 63 articulated to the leading end of said trailer 62. The transport means 61 has an overall length of substantially 17 meters. The transport means 61 carries a discharging device 64 which is mounted at the rear end 65 of the trailer 62. Compartments 66 and 67 are formed at opposite lateral sides of the trailer 62 and are intended to receive various jigs such as the jigs 16, 17, 18 and 19 which are illustrated in FIG. 4 of the drawings as being located therein. A central compartment 68 is formed between the compartments 66 and 67 and a support 69 is provided at the leading end of the central compartment to hold part of the discharging device 64 during travel of the transport means 61.

The discharging device 64 comprises a supporting arm that is generally indicated by the reference numeral 70, which arm can project some distance beyond the normal periphery of the transport means 61 as seen in plan view (FIG. 4). Such a projecting position is, for example, shown in FIG. 7 of the drawings. The arm 70 is formed in three interconnected parts 71, 72 and 73 and is turnable as a whole about a substantially vertical axis 74 (FIG. 9) afforded principally by a substantially vertical shaft 75 mounted centrally on the rear end 65 of the trailer 62. The arm 70 is connected to a vertical sleeve or bushing 76 which surrounds the greater part of the shaft 75, the lower end of said bushing 76 being journalled by a vertical bearing 77 and the upper end by a vertical bearing 78 carried at the top of the shaft 75. A toothed ring 79 is secured around the sleeve or bushing 76 in the region of the lower bearing 77 and is in driven mesh with the teeth of a pinion 80 fastened to the output shaft of a gear box 81 having an input shaft (not visible) that is driven by a hydraulic motor 82. The hydraulic motor 82 is arranged to be driven from a hydraulic system of the trailer 62 or the road tractor 63 but such system being conventional and well within the skill of the art is not shown in the accompanying drawings.

Figures 9, 10, 11, 12:
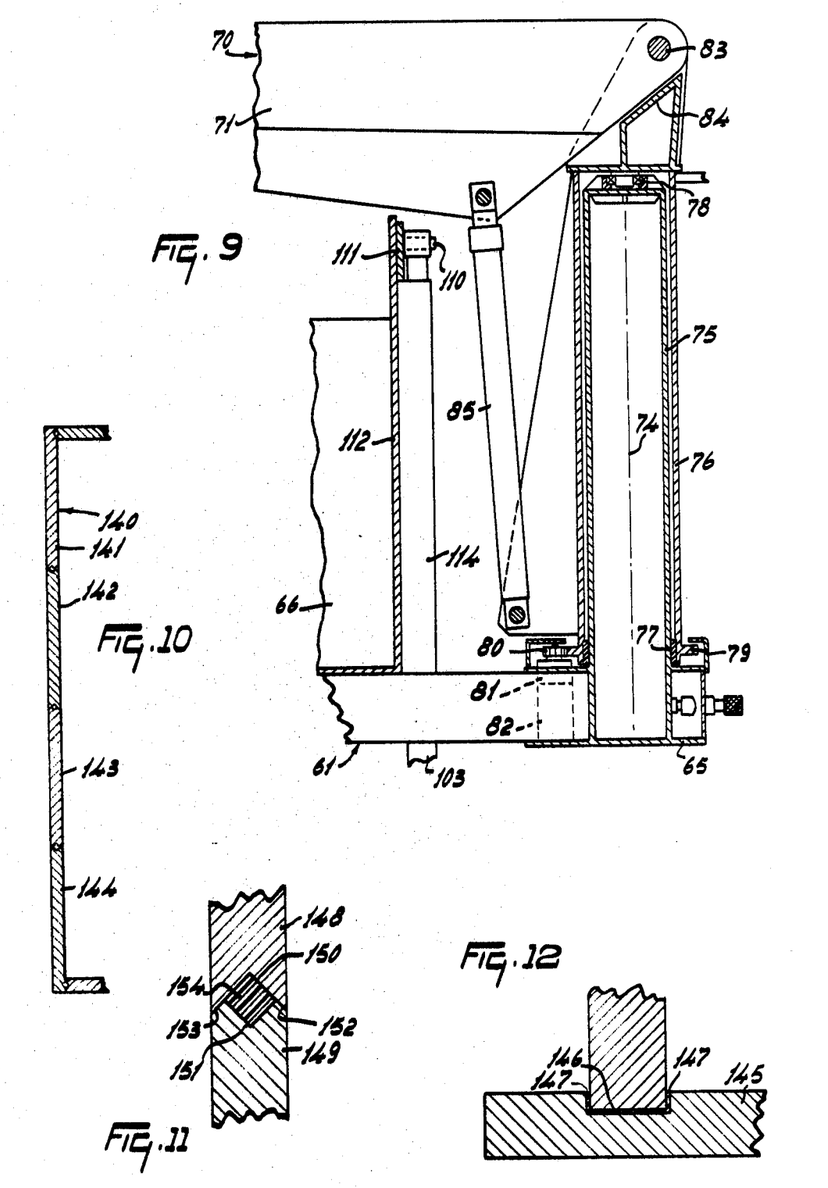
FIG. 9 is a section, to an enlarged scale, taken on the line IX—IX of FIG. 4.
FIG. 10 is a plan view illustrating an alternative building construction.
FIG. 11 is an enlarged broken view showing a junction between two wall sections as illustrated in FIG. 10 in greater detail.
FIG. 12 is a sectional elevation illustrating details of a junction between a wall and a floor of a prefabricated building in accordance with the embodiment of FIG. 10.

The supporting arm 70 is pivotally connected to a mounting at the top of the sleeve or bush 76 by a substantially horizontal shaft 83 and it will be seen from FIG. 9 of the drawings that a rest 84 also forms part of said mounting, the rest 84 affording a supporting abutment against which the arm 70 can bear when it is in a substantially horizontal position. A hydraulic piston and cylinder assembly 85 has its opposite ends pivotally connected between the arm part 71 and a lower region of a plate carried by the sleeve or bushing 76 and it will be evident from the drawings that extension of the piston of the assembly 85 will cause the arm 70 to be turned upwardly about the pivotal shaft 83. The arm parts 71 and 72 are interconnected by a substantially horizontal pivot 86 and the arm parts 72 and 73 are similarly interconnected by a further substantially horizontal pivot 87. The free end of the arm part 73 carries coupling means in the form of a grab ring 92 which is turnably connected to said arm part by a substantially horizontal pivot 91 and which is provided with limbs 117 and 118.

Figures 5, 6:
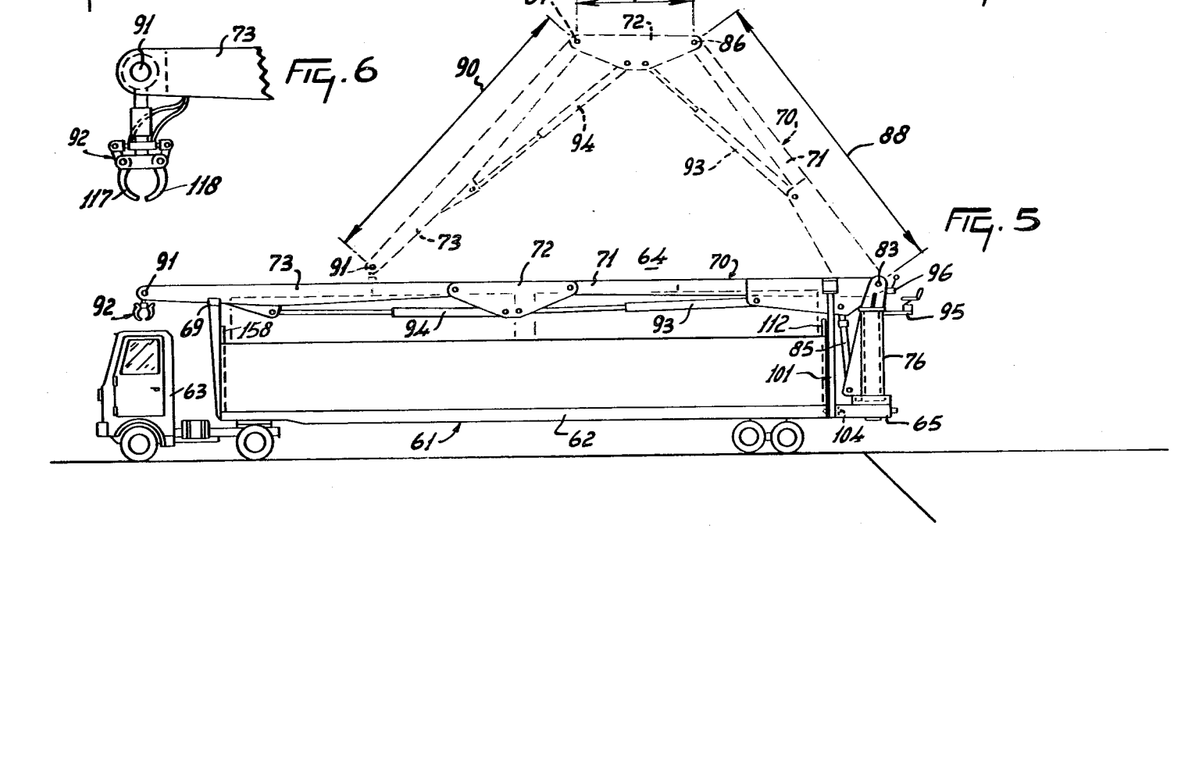
FIG. 5 is a side elevation corresponding to FIG. 4.
FIG. 6 is an elevation, to an enlarged scale, illustrating a coupling of a discharging device disposed at the end of an arm part of the transport means of FIGS. 4 and 5 in greater detail.

As can be seen in FIG. 5 of the drawings, the arm parts 71, 72 and 73 have lengths (as measured between the pivots adjacent their opposite ends) 88, 89 and 90 respectively, the lengths 88 and 90 being substantially equal while the length 89 is equal to substantially one-third of either of the lengths 88 or 90. Angular displacement of the parts 71 and 72 relative to one another about the pivot 86 is effected by extension and retraction of the piston rod of a hydraulic piston and cylinder assembly 93 having opposite ends which are pivocally connected to those parts, angular displacement of the parts 72 and 73 relative to one another about the pivot 87 is effected by extension or retraction of the piston rod of a hydraulic piston and cylinder assembly 94 having opposite ends which are pivotally connected to the two parts 72 and 73. The hydraulic piston and cylinder assemblies 85, 93 and 94 are connected to the hydraulic system of the trailer 62 or road tractor 63 by flexible ducts and the like which have been omitted from the accompanying drawings for the sake of clarity. However, it will be noted from FIGS. 5, 7 and 8 of the drawings that a seat 95 is carried by a platform at the top of the sleeve or bushing 96 and that a bank of controls 96 for the operation of the hydraulic motor 82 and the piston and cylinder assemblies 85, 93 and 94 and other parts is disposed within reach of an occupier of said seat 95.

Figure 8:
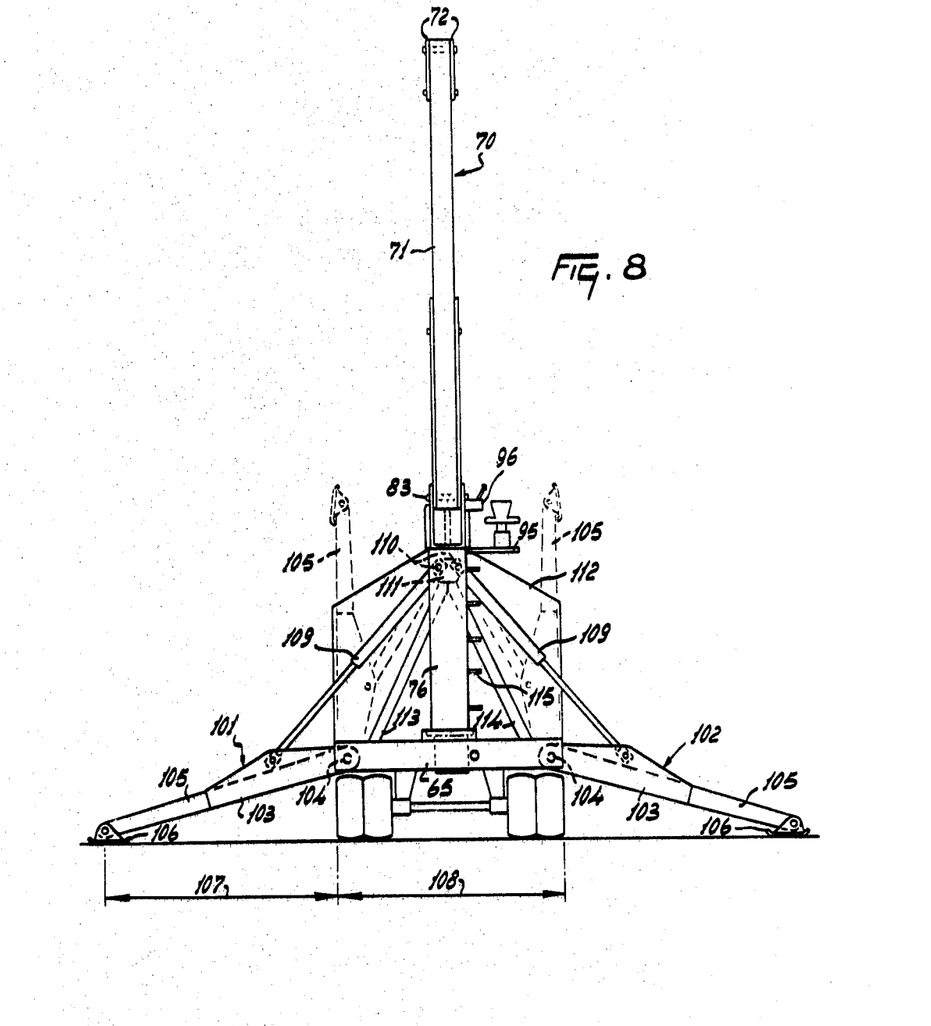
FIG. 8 is a rear elevation, to an enlarged scale, as seen in the direction indicated by an arrow VIII in FIG. 4, but with parts of the transport means occupying alternative positions to those shown in FIG. 4.

Stabilizing members 101 and 102 (FIG. 8) are provided at opposite sides of the rear end 65 of the trailer 62 at positions close to the axis 74 as regards the longitudinal direction of the trailer 62. The stabilizing member 101 comprises a supporting arm 103 which is connected to the trailer end 65 with the aid of a horizontal pivot 104 that extends substantially parallel to the longitudinal direction of the trailer. The arm 103 includes a telescopically, extensible portion 105 having a free end which carries a pivotally mounted ground-engaging foot 106. When the portion 105 is fully extended from the arm 103 and the foot 106 is in contact with horizontal ground, the stabilizing member 101 projects laterally beyond the trailer 62 by a distance 107 (FIG. 8) that is substantially equal to the transverse width 108 of the trailer 62 itself. In the embodiment which is being described the width 108 has a magnitude of substantially 250 centimeters. The piston rod of a hydraulic piston and cylinder assembly 109 has its free end pivotally connected to the arm 103 while the cylinder of that assembly is itself turnably connected to the top of a supporting frame 111 by a substantially horizontal pivot pin 110. FIGS. 8 and 9 of the drawings show that the supporting frame 111 is disposed alongside the rear surface of a rear wall 112 of the compartments 66, 67 and 68 and comprises two upwardly convergent struts or beams 113 and 114. It is not necessary to describe the stabilizing member 102 in detail since it is substantially symmetrically identical to the stabilizing member 101. Accordingly, corresponding parts of the stabilizing member 102 are indicated in the drawings by the same reference numbers as are used for the parts of the stabilizing member 101.

Figure 7:
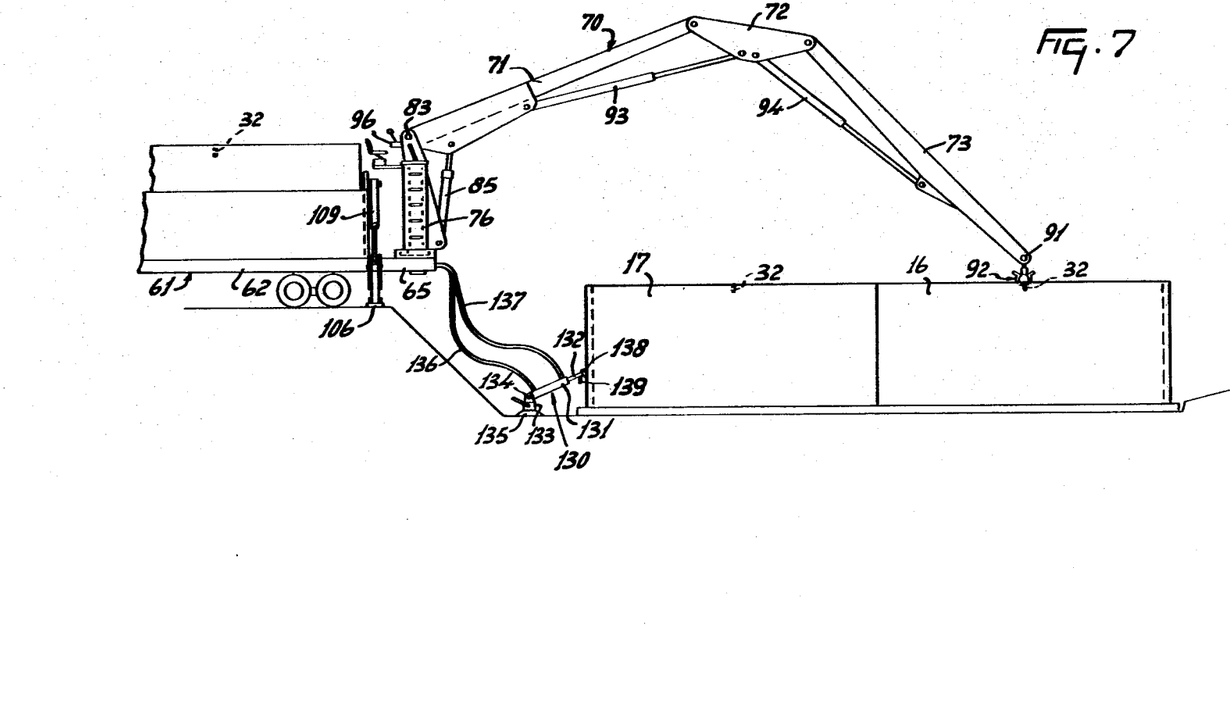
FIG. 7 is a side elevation illustrating the operation of the discharging device of the transport means of FIGS. 4 and 5.

Before making the cellar which has been described with reference to FIGS. 1 to 3 of the drawings, a ground cavity is excavated so as to have a flat bottom as shown in FIG. 7. The floor 15 of the cellar is then made by, for example, pouring a concrete mix formulated to produce a hard concrete reinforced by the rods 55 shown in FIG. 3. The guide members 47 are placed in their appointed positions prior to the pouring of the concrete and are maintained in those positions by connections to the reinforcement rods 55. As previously mentioned, the guide members 47 are preferably spaced apart by distances of substantially 50 centimeters and their upper regions, including the projections 48 and 49, are disposed above the upper surface 116 of the floor 15 when the concrete has set. As soon as the concrete of the floor 15 has substantially set, the jigs that have been described with reference to FIG. 1 of the drawings are placed in the positions appointed therefor by the prior placing of the guide members 47. In order that the jigs, including the jigs 16 to 30, can be quickly and easily placed in their appointed positions, they are brought to the building site by the transport means 61. The tractor 63 is driven to a position closely adjacent the floor 15 so that the pivotal axis 74 of the discharging device 64 is located as close as possible to the intended position of a central region of one of the longer outer walls of the cellar, for example, the wall 7.

As soon as the transport means 61 is in a suitable position, the piston and cylinder assemblies 109 are operated to swing the stabilizing members 101 and 102 outwardly from the inoperative broken line positions thereof that are indicated in FIG. 8 of the drawings to the operative positions thereof that are shown in full lines in the same figure, the extensible portions 105 of the arms 103 being contemporaneously brought to their fully extended positions. When the feet 106 are in contact with the ground, the trailer 62 is stabilized to an extent more than sufficient to counteract any danger of tipping which might otherwise occur during the use of the discharging device 64. The members 101 and 102 are fixed in their operative positions by the hydraulic assemblies 109. The assemblies 109 are coupled with the hydraulic system of the trailer 62 or the road tractor 63. As soon as the trailer 62 is fully stabilized, the arm 70 of the discharging device 64 is used to remove the required jigs from the compartments 66, 67 and 68. To this end, the jigs can be temporarily coupled to the grab ring 92 by employing the holes 41 and 46 (FIG. 3) in their coupling members 32. The discharging device 64 is operated to bring the various jigs to substantially their positions of use on the floor 15 where they constitute a casting mold for the internal and external walls of the cellar. When, as will usually be the case, the walls are made from a castable material such as concrete, the jigs are disengaged from the walls after the concrete has set. This is done by knocking out the wedges 51 after which the jigs can be lifted away from the set concrete along the pin-shaped bars 50. The bars 50 may be left embedded in the concrete of the walls, their projecting ends being removed in order not to interfere with the flat surfaces of the walls. The bars 50 may, for example, be formed from a strong but somewhat brittle metallic material so that the projecting ends can be broken off by, for example, hitting them with a hammer. Alternatively or in addition, the bars 50 may be formed with constrictions at regions thereof that will be substantially coplanar with the opposite surfaces of the finished walls thus facilitating the fracture of the bars when required and substantially avoiding breakage thereof at incorrect points. It is also possible to arrange for the ends of the bars 50 to be broken off before the jigs are removed from the walls. Under these circumstances, the jigs are provided with tapering holes for the reception of the bars, said holes tapering inwardly of the material of the jig plates towards the concrete.

After the jigs are disengaged from the set walls, the discharging device 64 can be employed to re-load them into the compartments 66 to 68 of the trailer 62. The compartments 66 to 68 are formed with closed ends 158 and 112 at the front and rear of the transport means 61. The central compartment 68 of the trailer 62 is intended to carry only a limited number of jigs, the remainder of the compartment being intended for carrying reinforcement rods and the like for the concrete walls, tools and structural members such as angle irons 121 and 122 shown in FIG. 2 of the drawings and to which reference will be made below. The discharging device 64 is operated from the seat 95 which is accessible by way of a flight of rungs 115 carried by the sleeve or bushing 76 (FIG. 8). The grab ring 92 which is shown in FIG. 6 of the drawings is operated from the controls 96 and includes a hydraulic mechanism by which limbs 117 and 118 of the ring can be closed together around a member that is to be contacted or can be moved apart to release that member. The supporting arm 70 in the discharging device 64 can arrange all of the jigs that are required for making one story of a building in their appointed positions from a single location of the transport means 61 provided that said location is sufficiently close to the building and that said story does not greatly exceed 12 meters in length by 11 meters in width. The trailer 62 can carry all of the jigs that are required for the erection of a single story having such measurements. The total length of the supporting arm 70 is substantially 17 meters and this length is approximately equal to the combined overall length 58 of the trailer 62 and road tractor 63 of the particular embodiment which is being described. The arm 70 has considerable maneuverability inasmuch as it can turn through 360° about the axis 74 and because it is composed of three pivotally interconnected parts the central one of which is markedly shorter than the other two parts. The grab ring 92 of said arm 70 can thus be moved close to the trailer 62 in the region of the supporting shaft 75 of the arm 70 and it is preferred that the arm 70 should be designed so that its grab ring 92 can reach substantially anywhere within a ground surface of not less than substantially 100 square meters from a given position of the transport means 61.

The jigs are of a strong but light-weight construction since they are formed principally by the plates 33 and 36 and by the strengthening ribs 34, 35, 37, and 38. When the jigs are placed on the floor 15, they can easily be pushed against, for example, the guide projections 48 and 49 of the guide members 47, such pushing conveniently being effected by an auxiliary jack 130 that is shown in FIG. 7 of the drawings. The auxiliary jack 130 comprises a cylinder 131 which receives a piston rod 132. The cylinder 131 is turnably connected to a stand 133 by a horizontal pivot 134, said stand 133 being provided with a suction cup 135 or other support that is arranged to occupy a temporarily fixed position relative to the ground surface. Flexible ducts 136 and 137 place the cylinder 131 of the double-acting piston and cylinder assembly in connection with the hydraulic system of the trailer 62 or tractor 63 and it will be seen from FIGS. 7 of the drawings that the free end of the piston rod 132 is provided with both a pushing member 138 and a pulling member 139. The auxiliary jack 130 can be used for either pushing or pulling when the suction cup 135 or other support is secured to the ground, the auxiliary jack 130 being provided with control members (not shown) for the operation of the suction cup 135 and for extension, or withdrawal, of the piston 132. As well as pushing the jigs into their required positions, the auxiliary jack 130 may also conveniently be used for disengaging those jigs from the cast walls and from the coupling bars 50. The auxiliary jack 130 may conveniently be arranged in the central compartment 68 of the trailer 62 when the transport means 61 is travelling.

The methods and apparatus that have been described above are particularly suitable for the rapid construction of, for example, the cellars, basements and other substructures of various buildings. Once the cellar or other substructure has been completed, the further storys of the building can be erected with such story being afforded by, for example, prefabricated room units in the form of space-enclosing sections 128 (FIG. 2). FIG. 2 shows a section 128 having a ground level floor 125 and opposite side walls 126 and 127. The cellar shown in FIGS. 1, 2 and 3 is made principally of cast material with the aid of the described jigs. The substructure of the building 1 can be made rapidly in the manner which has been described because substantially all of the required parts are brought to the building site in one operation by the transport means 61, said transport means 61 being provided with apparatus (i.e. the discharging device 64 and the auxiliary jack 130) by which the necessary jigs and other parts can be put to use in making the cellar in a minimum of time and with a minimum of manual labor in order that the sections of the remainder of the building 1 can rapidly be assembled to form, for example, a dwelling of the bungalow type, the tops of the walls 7 and 9 of the cellar are provided throughout their lengths with the aforementioned angle irons 121 and 122. As can be seen in FIG. 2 of the drawings, these angle irons receive and locate the prefabricated sections 128 of the remainder of the building, said angle irons being mounted in their appointed positions during the making of the walls of the cellar. FIG. 3 of the drawings shows that the vertical limb of one of the angle irons 121 is drawn against a vertical limb of the angular portion 39 at the top of the jig plate 33 by one or more wires 123 that are mounted around the angle iron 121 and are entered through holes in said limb of the angular portion 39. The horizontal limb of the illustrated angle iron 121 is provided with a plurality of downwardly directed pins 124 that project into the poured concrete of the wall 7 which concrete will set around those pins. As soon as setting has been completed, the wires 123 can be broken to release the angle iron 121 from the angular portion 39 at the top of the jig plate 33. As previously mentioned, supplies of the angle irons 121 and 122 are carried in the central compartment 68 of the trailer 62 prior to their use. Although the transport means 61 has been described as principally carrying jigs and the cellar of the building 1 has been described as being formed principally from concrete or other castable material, it is emphasized that the compartments 66, 67 and 68 of the transport means 61 can equally well be employed for the carrying of prefabricated wall, floor and ceiling or roof panels for the complete or partial construction of various buildings which need not necessarily have cellars, basements or other substructures.

FIGS. 10, 11 and 12 of the drawings show details of part of a cellar which may have the same general shape as the cellar shown in FIG. 1 but whose construction is different. In this embodiment, wall sections prefabricated from concrete or other cast material are arranged on the floor 15, such wall sections being dimensioned so that they can readily be carried in the compartments 66, 67 and 68 of the transport means 61 and so that they can be mechanically handled by the discharging device 64 when a building site is reached. A wall 140 that may correspond to the wall 7 shown in FIG. 1 is made from four prefabricated wall sections 141, 142, 143 and 144. These wall sections are mounted on a horizontal floor 145 (FIG. 12) that corresponds to the floor 15 (FIGS. 1, 2 and 3). The floor 145 is formed with grooves 146 for the guided reception of the wall sections which sections are lifted directly from the compartments 66 to 68 of the transport means 61 by the discharging device 64 which then brings them to substantially their appointed positions. The lowermost edges of the wall sections are fastened in the grooves 146 by a layer 147 of mortar although alternative or additional seal-promoting materials may be employed in any particular installation where dampness is likely to be a problem.

Walls corresponding to the walls 13 and 14 can be brought to the erection site in a prefabricated form and can be placed in their appointed positions in the same manner as the sections 141 to 144 of the wall 140. The abutting edges of the various wall sections are formed with co-operating grooves and ridges in the manner which can be seen in detail in FIG. 11 of the drawings. Abutting edge regions 148 and 149 of two wall sections are provided with a V-shaped groove 150 that extends throughout the thickness of the edge region 148 and with a smaller groove 151 that extends throughout only a central part of the thickness of the edge region 149. The smaller groove 151 is flanked by bevels 152 and 153 whose inclinations match those of the surfaces of the V-shaped (in cross-section) groove 150. The surfaces of the groove 150 and those of the groove 151 may be inclined to one another at 90° and it will be seen from FIG. 11 of the drawings that a square cross-section space or recess 154 is formed in the thickness of the wall 140 between the large groove 150 and the smaller groove 151. The space of recess 154 may be filled with mortar during the erection of the wall 140 or some other material having superior water-sealing properties may be substituted if considered to be necessary.

When a cellar is constructed in accordance with FIG. 1 as modified by FIGS. 10, 11 and 12 of the drawings, a further story of the building 1 can be erected thereabove in the manner shown in FIG. 2. However, as an alternative to using prefabricated room units in the form of sections 128, the overlying story can be constructed on top of the cellar by employing a plurality of prefabricated floor and wall panels having the same general constructions as the wall sections 141 to 144 inclusive. These floor and wall sections of the further story or story of the building 1 can be carried in the trailer compartments of the transport means 61 and can be brought to substantially their intended positions by the discharging device 64 thereof. It will be apparent that the various walls that are either prefabricated or cast in situ can be provided, by using appropriate smaller jigs, with door, window and ventilator and like openings. Such openings are shown in FIGS. 1 ad 2 of the drawings for the purposes of illustration although it will, of course, be realized that only certain external wall openings for access purposes will normally be required when the external walls in question form parts of a cellar, basement or other substructure.

Although certain features of the building, transport means and method of construction that have been described and that are illustrated in the accompanying drawings will be set forth in the following claims as inventive features, it is that the invention is not limited to those features and that it includes within its scope all of the parts that have been described and/or illustrated in the accompanying drawings, and their method of use, both individually and in various combinations.

What we claim is:

1. A transport means for conveying walls, construction jigs for production of walls to building sites, said transport means comprising a load carrying portion thereof having at least one storage compartment divided into three longitudinally extending spaces adapted to carry said walls and jigs in an upright position generally parallel to the usual direction of travel of the transport means, and a discharging device located at one end of the load carrying portion of the transport means for said walls and jigs, wherein the discharging device includes a supporting member that can occupy a position in which it projects beyond the normal boundaries of the transport means as seen in plan view, said supporting member having three parts, one of said parts being a central part, hydraulic means connecting said central part to the other two said parts, said hydraulic means being all disposed on the same side of said supporting member, the discharging device also comprising coupling means for temporary connection to said walls and jigs to enable any such temporarily connected part to be lifted vertically from the transport means by the discharging device and transferred to substantially its appointed correct position relative to the building that is being constructed, the supporting member being extensible whereby it can convey said walls and jigs to substantially any position within the area of a building site adjacent beyond the transport means from a single position, said area having a magnitude of not less than substantially one hundred square meters.

2. Transport means as claimed in claim 1, wherein the supporting member is mounted on the transport means whereby it is turnable about a substantially vertical axis.

3. Transport means as claimed in claim 2, wherein the supporting member is turnable through 360° about said axis.

4. Transport means as claimed in claim 2, wherein said axis is disposed adjacent the rear end of the transport means with respect to the intended direction of forward travel thereof.

5. Transport means comprising a load carrying portion having at least one storage compartment adapted for carrying in a generally upright position walls and jigs that are to be used in the construction of buildings, said storage compartment being provided with sides entirely around its periphery and divided into three parts, one of said compartment parts being centrally disposed relative to the other two compartment parts and being smaller than said other two compartment parts which are substantially the same size, wherein the transport means has a discharging device which includes an articulated and turnable supporting member that is adapted to be placed over said compartment and to project outwardly in substantially horizontal positions it may occupy beyond all normal boundaries of the transport means as seen in plan view, said discharging device also including coupling means for temporary connection to selected of said walls and jigs in said parts of said compartment and for the lifting of same vertically therefrom, said supporting member being turnable through substantially 360° about a substantially vertical axis which is fixed relative to the remainder of the transport means whereby said supporting member is adapted to unload walls and jigs vertically from said compartment and unload same substantially 360° outwardly of the transport means, said axis being located adjacent the rear end of the transport means with respect to the intended direction of forward travel thereof.

6. Transport means as claimed in claim 5, wherein the supporting member is afforded by a lifting arm having at least three connected parts which are pivotable relative to one another.

7. Transport means as claimed in claim 6, wherein said lifting arm comprised three relatively pivotable parts, the central of said three parts having one end of two hydraulic piston and cylinder assemblies connected proximately thereto, the other end of each said assembly connected respectively to an opposite of an adjacent one of said parts, said assemblies entirely disposed on the lower side of said lifting arm.

8. Transport means as claimed in claim 7, wherein at least two parts of said lifting arm different lengths.

9. Transport means as claimed in claim 7, wherein the central one of said three parts is substantially shorter in length than the other two parts which are substantially equal in length to one another.

10. Transport means as claimed in claim 9, wherein said longer parts each have a length equal to substantially three times that of the central part.

11. Transport means as claimed in claim 5, wherein said supporting member is mounted near the top of a substantially vertical shaft.

12. Transport means as claimed in claim 11, wherein the supporting member is turnable about a substantially horizontal axis defined by parts located near the top of said shaft.

13. Transport means as claimed in claim 5 which comprises a trailer.

14. Transport means as claimed in claim 13, wherein a cooperating tractor is provided, said trailer and tractor having a combined length of substantially 17 meters.

15. Transport means as claimed in claim 11, wherein a support is provided on said transport means for receiving said supporting member when the latter is in an inoperative condition, said support being located relative to a plane of substantial symmetry of the transport means that extends in the intended direction of straight travel of the latter.

16. Transport means as claimed in claim 15, wherein a plurality of said storage compartments for receiving said walls and jigs are disposed adjacent the lateral sides of said transport means.

17. Transport means as claimed in claim 16, wherein compartments at the front and rear of said transport means are formed with closed ends.

18. Transport means as claimed in claim 16, wherein a central compartment of the trailer is disposed beneath the position appointed for the supporting member when that member is not in use, said central compartment being constructed and arranged for the storage of tools and other parts.

19. Transport means as claimed in claim 12, wherein said supporting member of said discharging device is hydraulically operated.

20. Transport means as claimed in claim 19, wherein a seat and controls for the operation of the discharging device are arranged adjacent the rear end of said supporting member at a height which is substantially higher than the height of said compartment sides, said seat, controls and discharging device all being turnable about said substantially vertical axis.

21. A combination of transport and discharge means used in a method of construction of the kind set forth wherein the transport means which is provided with a discharging device carries a plurality of mold parts to the construction site for a building and, at a single location at said site, said discharging device transfers said mold parts to substantially their positions of use in forming parts of that building, said mold parts being carried in a compartment having sides defining its periphery by said transport means vertically disposed and in parallel alignment with the usual direction of travel of said transport means, said discharging device being pivotable about a vertical axis located on said transport means to the rear or said mold parts carried thereby, said discharging device having an extended length which is substantially the same as said transport means and being carried at substantially the forward end of said transport means and forward of said mold parts carried therein, said discharging device being articulated about a horizontal axis proximate said vertical axis and being simultaneously foldable at both ends of a portion thereof disposed at a location approximately midway of its length about further horizontal axes at each said end, said transport means being oriented at said location whereby the rear of said transport means substantially faces at least part of the building being constructed.

22. A tractor trailer combination for transporting mold parts for forming molds to cast at least a substantial portion of a building, which comprises a bed of said trailer, sides and forward and after walls extending around the periphery of said trailer bed enclosing an elongated rectangular area as seen from above adapted for receiving said mold parts in an upright position parallel to the usual direction of travel of the trailer, a discharging device mounted on the after portion of said trailer behind said rectangular area, said discharging device comprising an articulated arm adapted to extend a distance equal to at least the length of said trailer, said arm comprising two elongated portions which are substantially equal in length and are connected by a substantially shorter portion, hydraulic means connecting said arm portions and controlling them whereby they are foldable from a substantially straight configuration to that of an inverted "V" with said shorter portion remaining substantially horizontal, said arm being on turnable means mounted on the rear portion of said trailer whereby it is turnable about a vertical axis, coupling means provided on said discharging device for engaging a said mold part by said discharging device, support means for receiving said arm on the forward part of said trailer, said coupling member being disposed substantially forward of said support means and over said tractor when said arm is in transport position.

23. A tractor trailer combination for transporting mold parts for forming molds to cast at least a substantial portion of a building, which comprises a bed of said trailer, sides and forward and after walls mounted around the periphery of said trailer bed enclosing an elongated rectangular area as seen from above adapted for receiving said mold parts in an upright position disposed generally parallel to the longitudinal axis of said trailer, a discharging device mounted on the after portion of said trailer, said discharging device comprising an arm capable of projecting beyond the entire periphery of said trailer bed, said arm comprising three articulated interconnected parts and being provided with means whereby it is turnable from its after mounting about a substantially vertical axis, a first of said arm parts extending from said after mounting, a second of said arm parts extending from said first arm part, and a third arm part extending from said second arm part and having coupling means for lifting said mold parts on its opposite end, said first and third arm parts being substantially equal in length and said second arm part being substantially shorter in length than said first and third arm parts, two hydraulic mechanisms for articulating said parts relative to each other connected to said second arm part and to said first and third arm parts whereby said arm is foldable from a horizontal aligned position to an inverted V-shaped folded position in which said first and third arm parts are inclined downwardly from said second arm part which is retained in a substantially horizontal position.

24. An elongated trailer adapted to be towed by a tractor truck in highway traffic for transporting mold parts adapted to be positioned at a building site to provide molds to receive castable material for casting in one operation a substantial portion of one floor of a building, said trailer comprising a framework which is supported at least in part by ground engaging wheels disposed near the rear of the trailer, peripheral walls extending from said framework, enclosing an elongated rectangular space adapted to receive said mold parts in an upright position, at least two further walls longitudinally dividing said space, support means for a discharge device mounted on a platform provided at the rear of the trailer behind of said space and rearwardly of said wheels, an arm included in said discharging device which is rotatably mounted on said support means, said arm being extensible to lift mold parts from all parts of said space and place same at substantially their intended positions at the building site, a pair of stabilizing members mounted on each side of said trailer disposed laterally between said ground engaging wheels and said support means as seen from the side which are adapted to extend outwardly from the rear of the trailer whereby they engage the ground and provide props for said discharging device outwardly of said wheels whereby said support means may be extended over an excavation for the building, said stabilizing members provided with hydraulic means for raising and lowering same, said hydraulic means interconnecting said stabilizing members and stud means provided immediately to the rear of said enclosed spaces.

* * * * *